May 12, 1931.  G. KNOTT  1,804,625
HAYFORK
Filed March 27, 1930  2 Sheets-Sheet 1
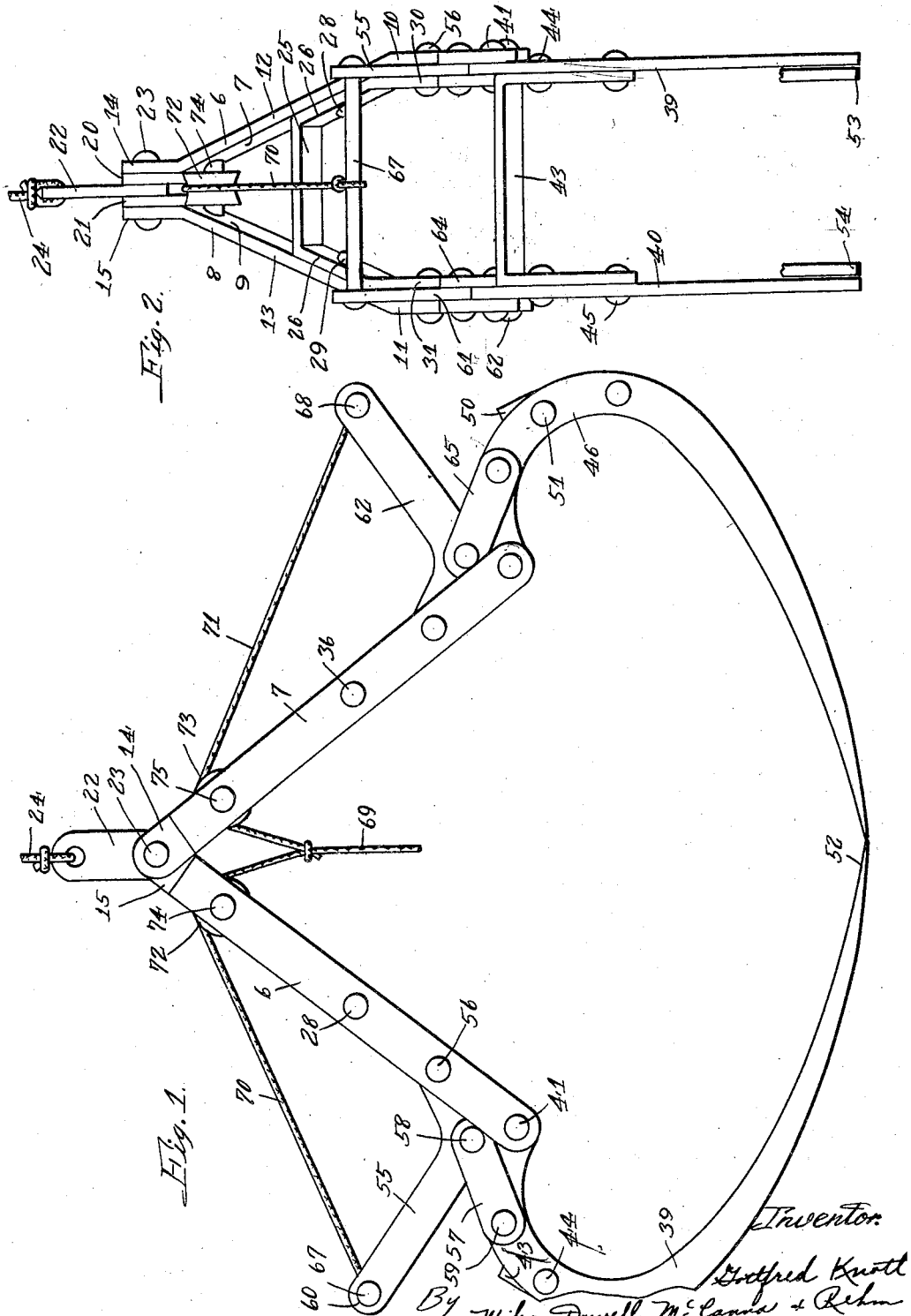

May 12, 1931.　　　　G. KNOTT　　　　1,804,625
HAYFORK
Filed March 27, 1930　　2 Sheets-Sheet 2
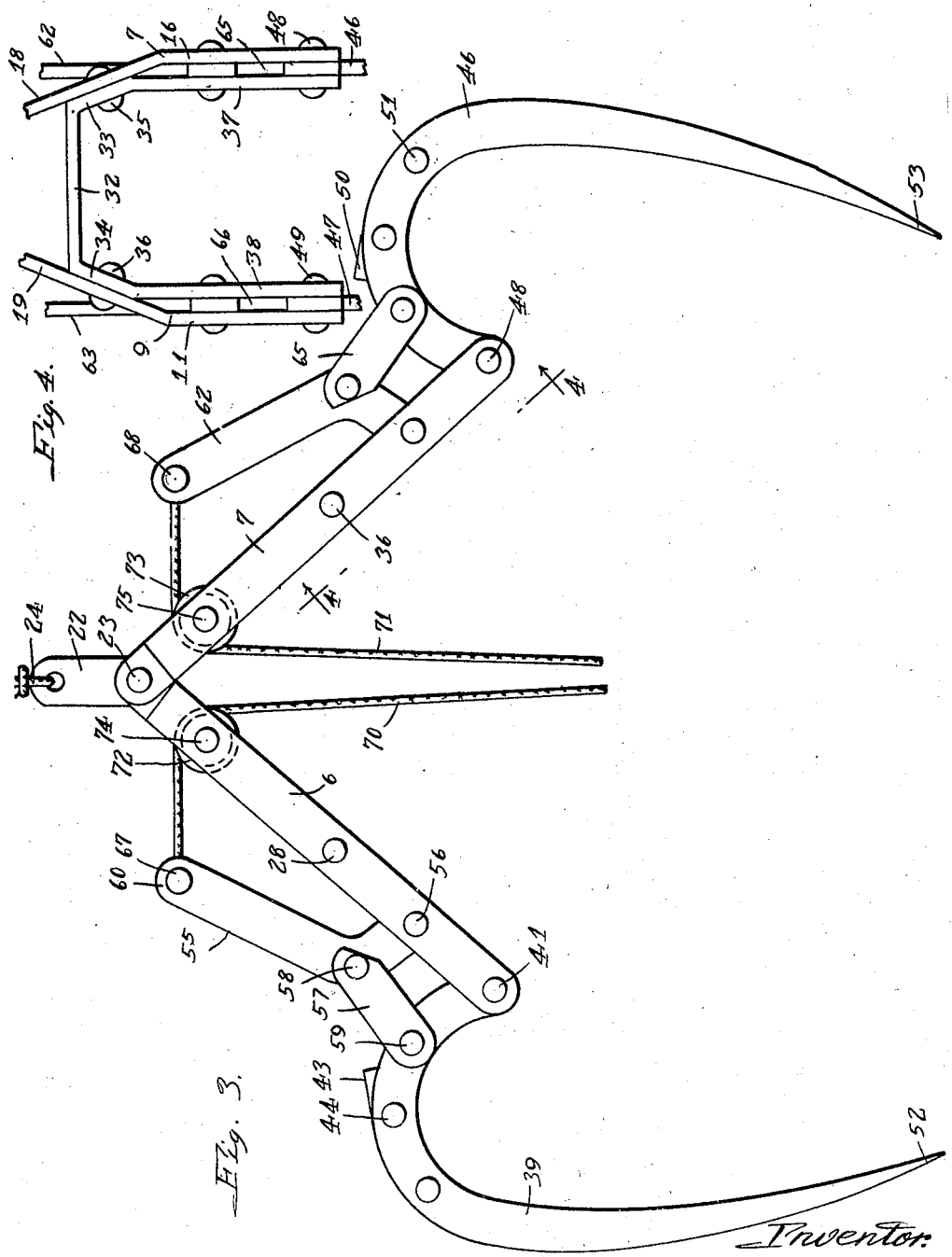

Patented May 12, 1931

1,804,625

UNITED STATES PATENT OFFICE

GOTTFRED KNOTT, OF DAVIS JUNCTION, ILLINOIS

HAYFORK

Application filed March 27, 1930. Serial No. 439,321.

My invention relates to hay forks of the type adapted for use in transferring large quantities of hay, as, for example, in placing hay in a mow, where it is carried upward along a track to a suitable place of storage, usually by means of horse drawn equipment.

The invention contemplates the provision of a generally improved fork for handling hay or other similar roughage which embodies all of the advantages of prior equipment and overcomes the disadvantages to which such equipment has been subject. For example, one of the greatest troubles encountered with the forks now generally in use is the difficulty in tripping the mechanism when the load has been conducted to the desired location. A cord or rope is usually provided and connected to the proper mechanism on the fork for this purpose, enabling the user to trip the mechanism from a distance. However, it frequently happens that the mechanism cannot be tripped in this manner and it becomes necessary to climb to the suspended fork to accomplish this.

One of the objects of my invention is to provide a fork which may be easily and positively tripped by means of a rope or cord.

I have also aimed to provide a fork of novel construction wherein the tines are held in the closed position by means of toggle joints and are released by drawing the joints past the center line thereof.

I have further aimed to provide a fork having tines shaped to be inserted into and removed from hay with greater ease and facility than those heretofore known. Other objects and attendant advantages will become apparent to those skilled in the art from the following description and the accompanying drawings in which—

Figure 1 is a side elevation of my improved hay fork in its closed position;

Fig. 2 is an end view of the fork;

Fig. 3 is a side elevation of the fork in its open position; and

Fig. 4 is a section on the line 4—4 of Fig. 3 showing the manner in which the side arms are braced and the tines and toggle joints are connected to the side arms.

The invention contemplates two pairs of side arms, each pair being spaced and rigidly connected together to act as a unit, the two pairs being pivotally connected at their upper ends to permit their lower ends to swing toward and away from each other. A tine of novel shape is pivotally attached at its upper end to the lower end of each side arm and a toggle joint is interposed between the arm and the tine intermediate the ends of each. Each toggle joint is arranged to rest slightly to one side of its center line when the tines occupy their closed position, so that the tines may not be moved to their open position by a force exerted against them. Means are provided at the knees of the joints to permit them to be drawn through center to move the tines to their open position.

While I have shown a four tined fork, it will be plain that the same principles apply to a fork of any number of tines, such, for example, as a two tined fork. Referring to Figs. 1 and 2, the numerals 6, 7, 8 and 9 designate the side arms of a four tined fork. The side arms 6 and 8 are arranged to act as a unit and are provided with substantially parallel lower ends 10 and 11, converging central portions 12 and 13 and substantially parallel upper ends 14 and 15. In like manner, as shown in Fig. 4, the side arms 7 and 9 are provided with substantially parallel lower ends 16 and 17; converging central portions 18 and 19; and parallel upper ends 20 and 21. The unit formed by the side arms 6 and 8 and that formed by the side arms 7 and 9 are each arranged to act as a separate unit, and are pivotally connected together and to a supporting member 22 at their upper ends by means of a bolt or rivet 23. The supporting member 22 may be formed as shown, of a solid piece or may contain a swivel as desired and serves to connect the fork to the lifting rope 24, the latter serving to transport the fork from place to place as desired through conventional mechanism.

The side arms 6 and 8 are fixedly connected together by means of a brace 25 which lies along the converging portions of the side arms 6 and 8 at 26 and 27 and are attached thereto by means of bolts or rivets 28 and 29. The ends 30 and 31 of the brace extend downward and are laterally spaced from the lower ends 10 and 11 of the side arms 6 and 8.

The side arms 7 and 9 are in like manner, fixedly connected by means of a brace 32 attached to the side arms at 33 and 34 by means of bolts or rivets 35 and 36, the lower ends 37 and 38 being spaced from the lower ends 16 and 17 of the side arms 7 and 8.

The tines 39 and 40 are pivotally positioned within the space formed between the lower ends 10 and 11 of the side arms 6 and 8, and the lower ends 30 and 31 of the brace 25 by means of bolts or rivets 41 and 42. The tines 39 and 40 are provided with a cross-brace 43 near their upper end connected thereto on either side, by means of bolts or rivets 44 and 45.

A second pair of tines 46 and 47 are pivotally positioned between the lower ends 16 and 17 of the side arms 7 and 9 and the lower ends 37 and 38 of the brace 32 by means of bolts or rivets 48 and 49. A brace 50 similar to the brace 43 is positioned between the tines 46 and 47 through rivets 51 to give them strength and rigidity. The tines 39, 40, 46 and 47, are identical in shape, the shape being such as to allow the tines to be easily inserted into the hay or roughage with which they are to be used, as will be obvious from Fig. 3. This shape contemplates giving the upper end of the tines a curvature substantially that of a half circle, and projecting the lower end in substantially a straight line from the lower end of the half circle. This is, however, not exactly a straight line but is given a slight curvature as shown in the drawing. The lower ends 52, 53, and 54, of the tines being brought to a point as shown in order to be more easily inserted into the roughage with which the fork is used.

Identical toggle joints connect each of the tines 39, 40, 46, and 47, with the side arms 6, 8, 7 and 9, respectively. A bell-crank lever 55 is pivotally positioned between the lower end 10 of the side arm 6 and the lower end 30 of the brace 25 at a point spaced from the end of the side arm 6, by means of a rivet 56. A toggle link 57 is pivotally connected at one end to the bell-crank lever 55 at the angle thereof by means of a rivet 58, and has its opposite end pivotally connected to the tine 39 spaced from the end thereof by means of a rivet 59. The toggle joint thus formed is arranged to have the rivet 58 which forms the knee thereof, at one side of the center line of the rivets 56 and 59 when the outer end 60 of the bell-crank lever 55 is at its lowermost point. When in this position downward pressure applied to the tine 39 will serve to force the upper end of the toggle link 57 against the edge of the side arm 6 which prevents the tine 39 from swinging to an open position about the pivotal support 41.

The tines 40, 46, and 47, are connected to side arms 8, 7 and 9, in like manner by bell-crank levers 61, 62, and 63 and toggle links 64, 65 and 66, all of which serve to prevent the downward movement of the respective tines to which they are attached. Cross-rods 67 and 68 serve to connect the bell-crank levers 55 and 61 and 62 and 63 so that each pair of levers will be actuated uniformly and at the same time. A trip rope or cord 69 having branches 70 and 71 attached to the cross-rods 67 and 68, is provided to permit all of the toggle joints to be tripped at the same time by means of a pull on the rope 69. The branches 70 and 71 are trained over pulleys 72 and 73 positioned between the side arms 6 and 8 and 7 and 9 respectively by means of pulley shafts 74 and 75, to permit the tripping operation to be carried out with as small an amount of energy as possible.

The operation of my improved fork will be seen to be at once efficient, easy and accurate. The fork is inserted into the roughage in the position shown in Fig. 2, the tines being inserted until the lower ends of the side arms 6, 7, 8, and 9 rest against the surface of the material. The toggle joints are then set by drawing the bell-crank levers 55, 61, 62, and 63, downward until the toggle links rest against the side arms. In this position lifting power is supplied to the rope 24, the fork being lifted upward carrying with it a full load of roughage. It will be seen that the tines are locked in this position since downward pressure applied to the points of the tines will only cause the toggle links to be forced against the side arms. However, when the fork has been transported to the point of discharge the rope 69 is pulled downward drawing the outer ends of the bell-crank levers upward thus drawing the knees of the toggle joints through the centers. When the knees are drawn through the center, the weight of the load on the tines will cause the fork to assume the position shown in Fig. 3, the weight thus aiding in the opening of the fork. It will, however, also be clear that in cases where light material, such as straw is being handled, the tines may be completely opened by tension on the trip rope 69, regardless of the weight of material on the tines.

It will be seen that the size of the load to be taken may be regulated by regulating the relative position of the two units formed by the side arms 6 and 8 and 7 and 9. When they are at a slight angle with respect to each other, the load to be grasped when the tines are inserted into the roughage will be considerably greater than will be the case when the angle between the two units is relatively small.

The tripping of the mechanism is singularly easy and positive. It is only necessary to draw the rods 67 and 68 upward a very slight distance to release the toggle joint. When the toggle joint is once released the weight of the hay itself aids in opening the fork. There is no point at which the fork may be locked by the weight of the hay itself as this weight aids in opening the fork. There is no point at which the fork may be locked by the wedging of the roughage between parts of the fork as is the case in the forks now generally in use.

The tines are so shaped that in their closed position they pass almost completely under the load of material to be lifted by the fork. The direction of the force against them is almost vertically downward. Consequently when the toggle joints are released the weight of the hay causes the tines to move downward and outward. When this movement occurs, due to the shape of the tines, the roughage is left free to slide directly downward therefrom. The shape of the tines also permits the toggle links to be attached directly thereto near the upper end thereof.

While I have thus described and illustrated a specific embodiment of my invention I am aware that numerous alterations and changes may be made therein without departing from the spirit of the invention and the scope of the appended claims in which—

I claim:

1. A hay fork comprising at least two side arms, curved tines pivotally attached to the lower end of each of said side arms to move between an open and a closed position, toggle joints connecting said tines with said side arms intermediate the ends of each, said joints being arranged to occupy a position past the center line thereof to hold said tines in their closed position and to be drawn through center to move said tines to their open position.

2. A hay fork comprising at least two side arms pivotally connected at their upper ends to move toward and away from each other, curved tines attached to the lower end of each of said side arms to move between an open and a closed position, and toggle joints connecting said tines with said side arms intermediate the ends of each, said joints being arranged to occupy a position past the center line thereof to hold said tines in their closed position and to be drawn through center to move said tines to their open position.

3. A hay fork including two units pivotally connected at their upper ends to swing toward and away from each other, each of said units having a pair of side arms, a pair of curved tines, one of said tines being pivotally attached to the lower end of each of said side arms to move between an open and a closed position, and toggle joints connecting said tines and said side arms intermediate the ends of each, said joints being arranged to occupy a position past center to hold said tines in their closed position, and to be drawn through center, to move said tines to their open position.

4. A hay fork including two units pivotally connected at their upper end to swing toward and away from each other, each of said units having a pair of side arms, means for holding said side arms in fixed relation, a pair of curved tines, means for fixedly connecting said tines, one of said tines being pivotally attached to the lower ends of each of said side arms to move between an open and a closed position, and toggle joints connecting said tines and said side arms intermediate the ends of each, said toggle joints being arranged to occupy a position past center to hold said tines in their closed position, and to be drawn through center to move said tines to their open position.

5. A hay fork comprising at least two side arms pivotally connected at their upper end to move toward and away from each other, curved tines attached to the lower end of each of said side arms to move between an open and a closed position, and toggle joints connecting said tines with said side arm, each of said joints comprising, a bell-crank lever having a short and a long leg, the end of said short leg being pivotally positioned upon a side arm intermediate the ends thereof, a toggle link having one end pivotally connected to said bell-crank lever at its angle and the other end pivotally connected to a tine intermediate the ends thereof, in a manner to permit the center of the pivotal connection between said toggle link and said bell-crank lever to pass below a straight line joining the center of said other two pivotal connections, and means for limiting the downward movement of said toggle joints, whereby said tines may be held in a closed position when said toggle joint occupies its lowermost point and may be drawn to their open position when said bell-crank lever is moved to draw said toggle joint to its uppermost point.

6. A hay fork comprising a frame structure, curved tines pivotally attached at spaced points to said frame structure to move between an open and a closed position, toggle joints connecting said tines with said frame structure intermediate the ends of said tines, said joints being arranged to occupy a position past the center line thereof to hold said tines in their closed position and to be drawn through center to move said tines to their open position.

In witness of the foregoing I affix my signature.

GOTTFRED KNOTT.